(No Model.) 6 Sheets—Sheet 1.
F. E. GIRARD & A. RIGAULT.
MACHINE FOR MAKING METALLIC CLASPS.
No. 377,379. Patented Feb. 7, 1888.
FIG. 1.
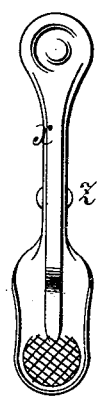
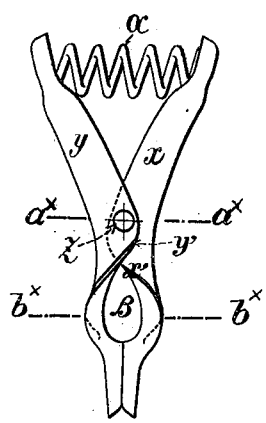
FIG. 4.
FIG. 5.
FIG. 6.
FIG. 3.
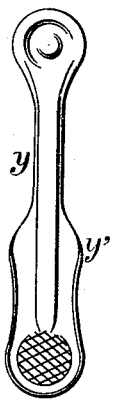
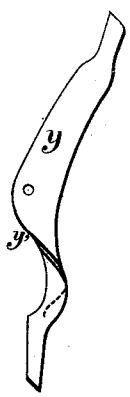
FIG. 2.
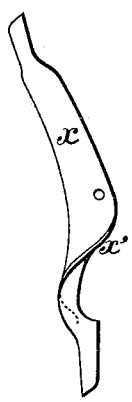
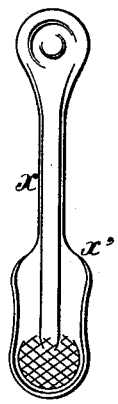
Witnesses:
A. Schehl
John M. Speer
Inventors.
F. E. Girard
Alex. Rigault
by Briesen & Steele
Attorneys.

(No Model.) 6 Sheets—Sheet 2.

F. E. GIRARD & A. RIGAULT.
MACHINE FOR MAKING METALLIC CLASPS.

No. 377,379. Patented Feb. 7, 1888.

Witnesses:
A. Schehl.
John M. Speer.

Inventors:
F. E. Girard
Alex. Rigault
by Bresen & Steele
Attorneys.

(No Model.) 6 Sheets—Sheet 5.

F. E. GIRARD & A. RIGAULT.
MACHINE FOR MAKING METALLIC CLASPS.

No. 377,379. Patented Feb. 7, 1888.

Witnesses:
A. Schehl.
John M. Speer.

Inventors:
F. E. Girard
Alex. Rigault
by Briesen & Steele
Attorneys.

(No Model.) 6 Sheets—Sheet 6.

F. E. GIRARD & A. RIGAULT.
MACHINE FOR MAKING METALLIC CLASPS.

No. 377,379. Patented Feb. 7, 1888.

WITNESSES:

INVENTORS
F. E. Girard
A. Rigault
BY Briesen & Steele
ATTORNEYS

UNITED STATES PATENT OFFICE.

FERDINAND EMILE GIRARD AND ALEXANDRE RIGAULT, OF PARIS, FRANCE.

MACHINE FOR MAKING METALLIC CLASPS.

SPECIFICATION forming part of Letters Patent No. 377,379, dated February 7, 1888.

Application filed September 4, 1885. Serial No. 176,212. (No model.) Patented in France August 7, 1885, No. 170,524; in Belgium August 14, 1885, No. 69,913; in England August 24, 1885, No. 10,003, and in Germany August 31, 1885, No. 35,406.

*To all whom it may concern:*

Be it known that we, FERDINAND EMILE GIRARD and ALEXANDRE RIGAULT, mechanical engineers, of Paris, France, have invented Improvements in Metal Clips for Fastening Papers, Pictures, Prints, Clothes, and for Analogous Purposes, and in Machinery Employed therein, (for which we have obtained Letters Patent in France, dated August 7, 1885, No. 170,524, for fifteen years; in Belgium, dated August 14, 1885, No. 69,913, for fifteen years; in England, dated August 24, 1885, No. 10,003, for fourteen years, and in Germany, dated August 31, 1885, No. 35,406, for fifteen years;) and we do hereby declare that the following is a full and exact description thereof, reference being made to the accompanying drawings.

The object of our invention is to provide improved machinery for manufacturing metallic clips.

The invention consists in the clips of the peculiar form hereinafter shown; also, in details of construction and combinations of parts of the machinery for making them, as hereinafter more fully set forth.

Reference is to be had to the accompanying drawings, forming part of this specification, in which—

Figure 7:
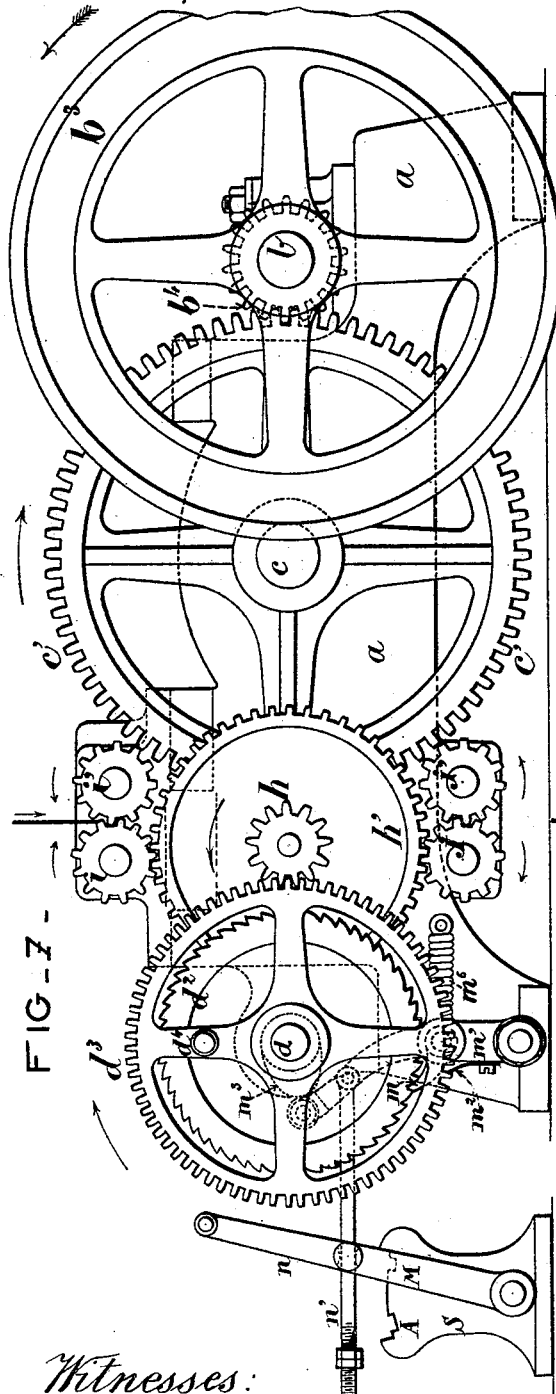
Figure 8:
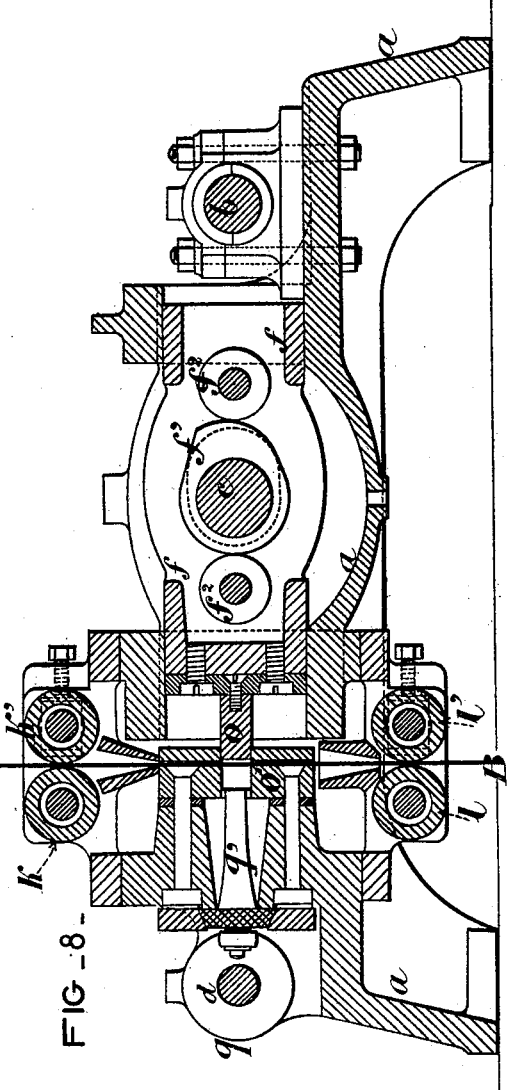
Figure 9:
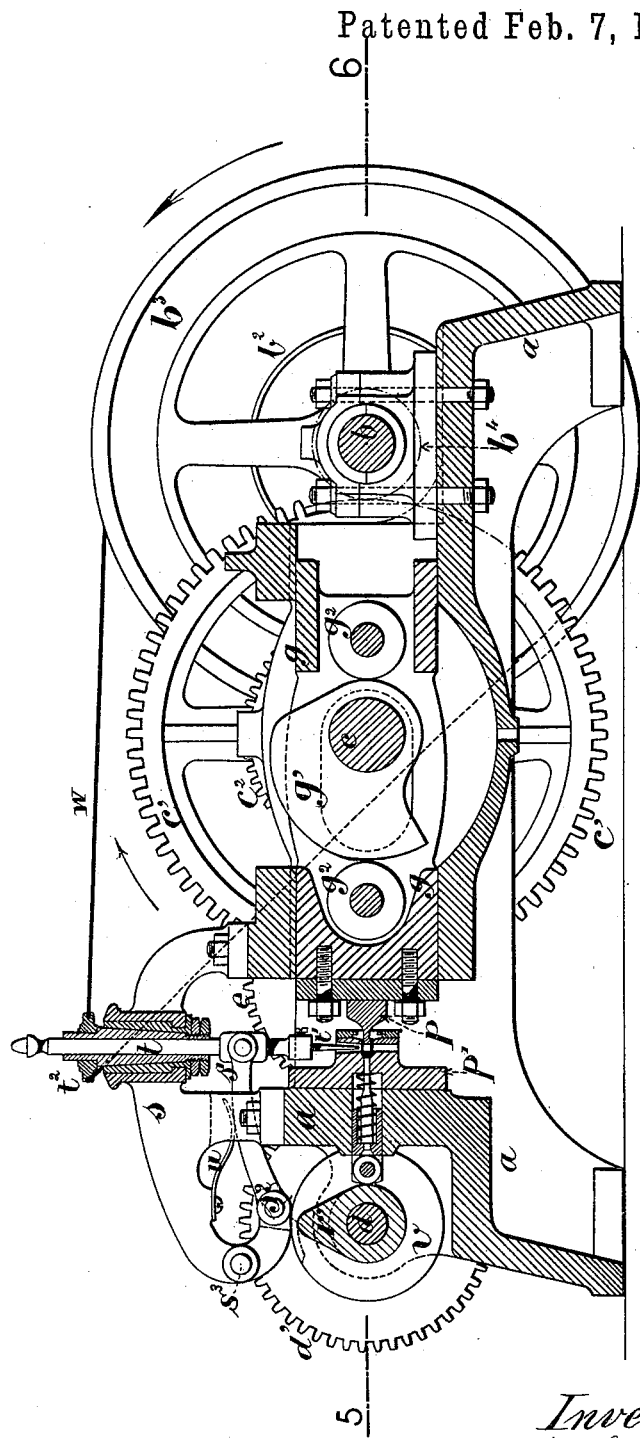
Figure 10:
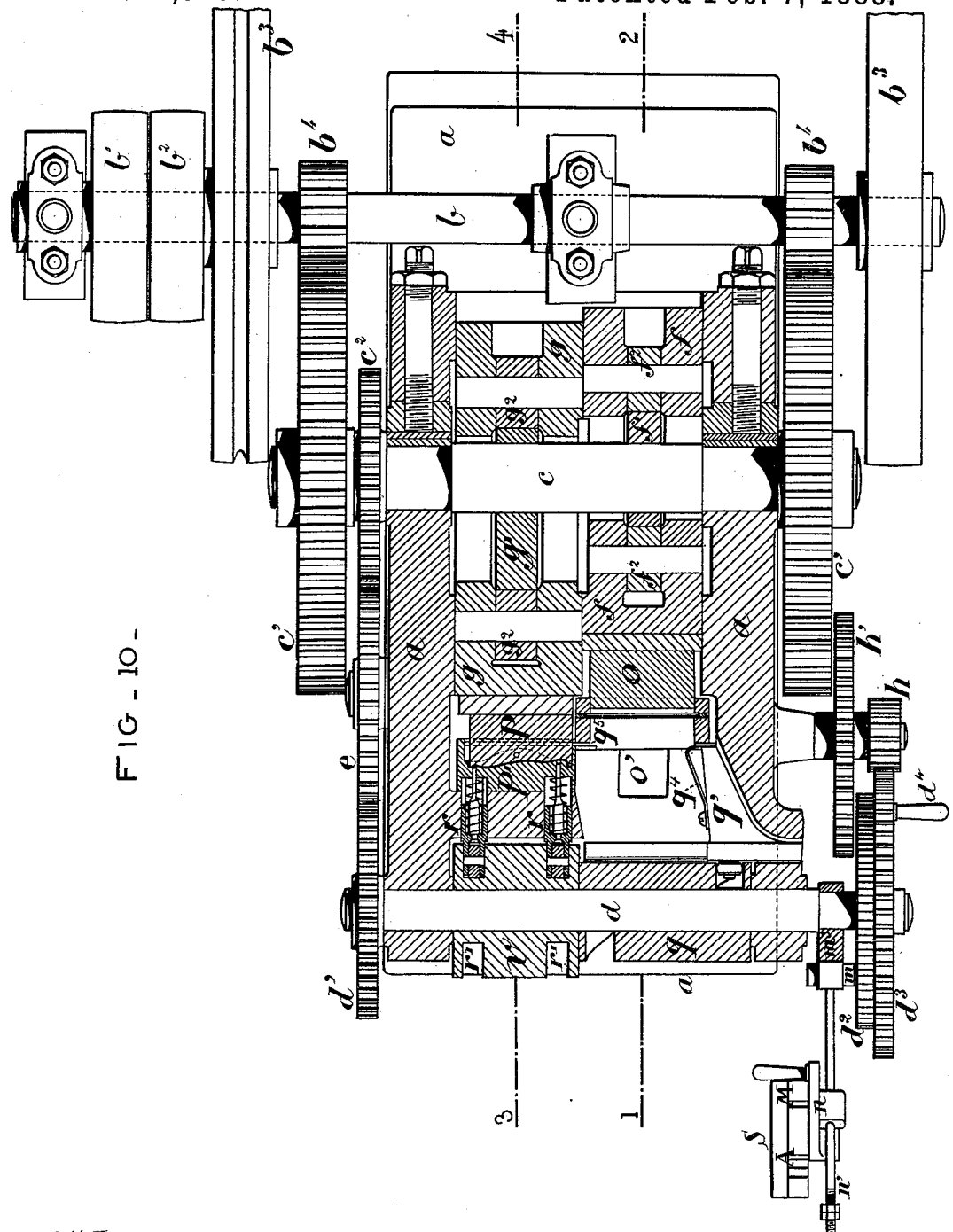
Figure 11:
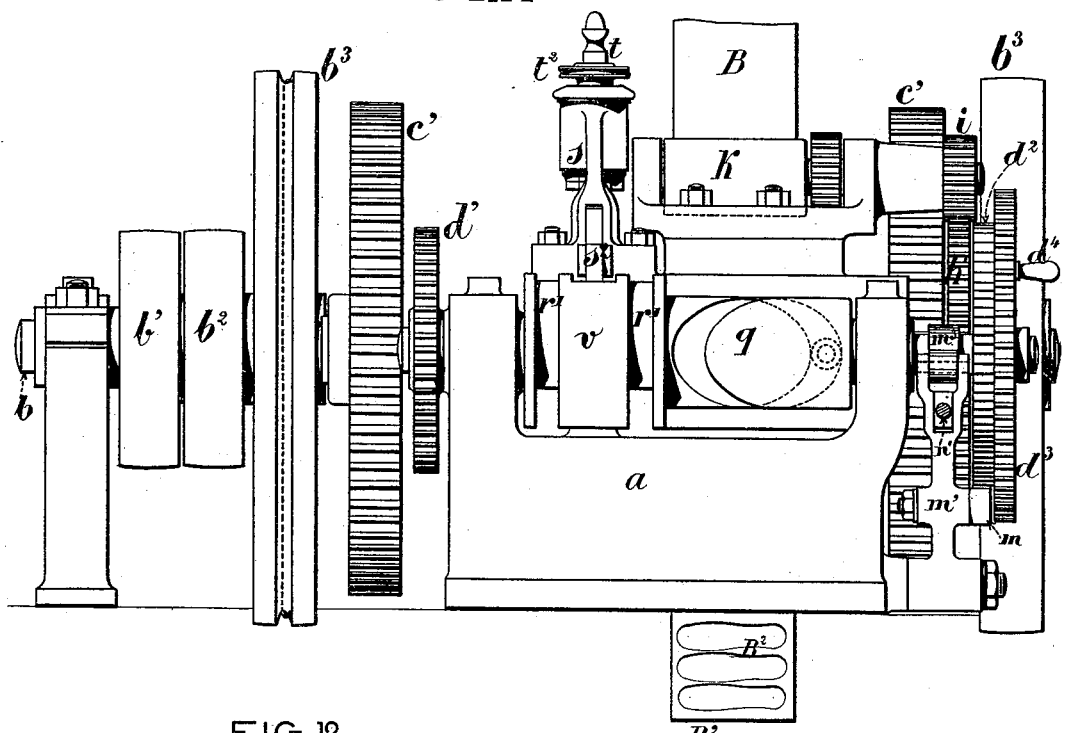
Figure 12:
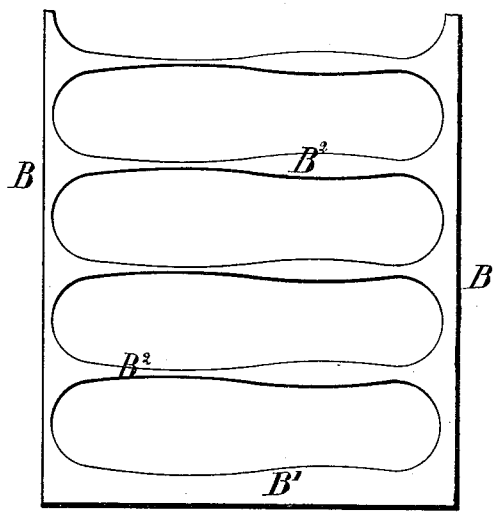
Figure 13:
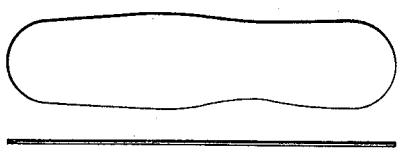
Figure 14:
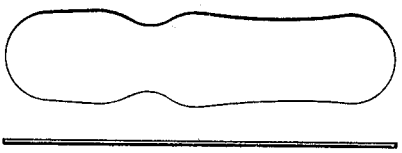
Figure 15:
Figure 16:
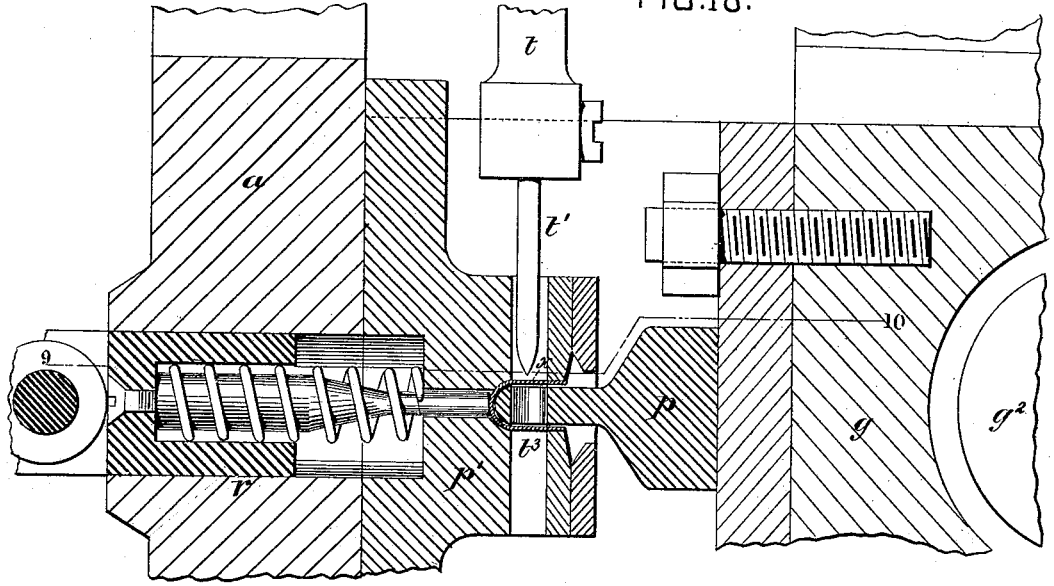
Figure 17:
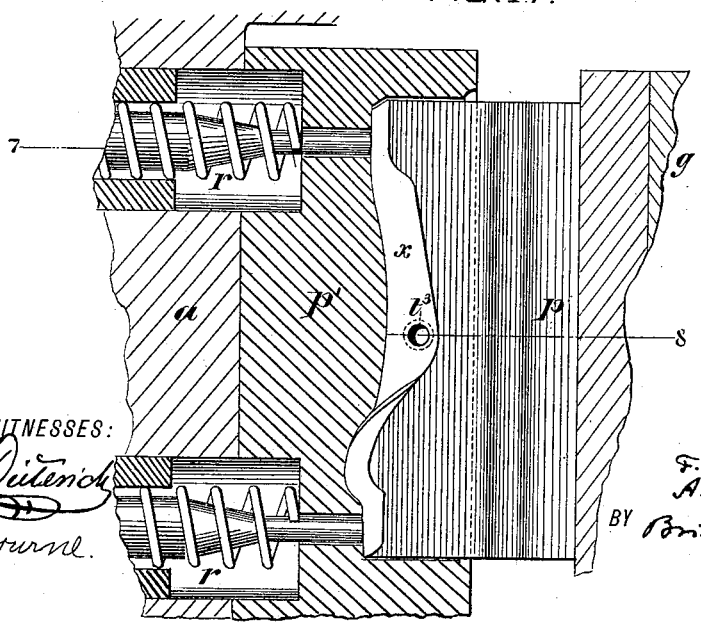

Figure 1 represents a side and edge view of a clip constructed according to our invention. Fig. 2 is a side and edge view of one-half of the clip. Fig. 3 is a similar view to Fig. 2 of the other half of the clip. Fig. 4 is a horizontal section through the upper portion of one of the sections of the clip. Fig. 5 is a horizontal section through a completed clip, the section being taken on the line $a^x$ $a^x$, Fig. 1. Fig. 6 is a horizontal section of the same on the line $b^x$ $b^x$, Fig. 1. Fig. 7 is a side elevation of a machine for making these clips constructed according to our invention. Fig. 8 is a vertical longitudinal section of the machine, taken on the line 1 2, Fig. 10. Fig. 9 is a vertical longitudinal sectional view of the machine, taken on the line 3 4, Fig. 10. Fig. 10 is a horizontal section on the line 5 6, Fig. 9. Fig. 11 is an end view of the machine. Fig. 12 is a face view of a metal band after the clip-blanks are cut out. Figs. 13 and 14 are views of the cut blanks. Fig. 15 is an enlarged side view of a portion of the ratchet-wheel $d^2$. Fig. 16 is an enlarged detail vertical cross-section through the mold $p$ $p'$ and surrounding parts, the section being taken on the line 7 8, Fig. 17; and Fig. 17 is an enlarged detail horizontal section on the line 9 10, Fig. 16.

These clips are made of any suitable metal, but preferably of zinc, an illustration of one of which is shown by Figs. 1, 2, 3, 4, 5, and 6 in the accompanying drawings. The clip consists of two parts, separately represented by the letters $x$ $y$. These two parts are connected in the center by the joint or pivot $z$. The edges at the upper part of the branches are bent inward, so as to form two small recesses sufficiently deep wherein to secure and contain the ends of a spiral spring, $a$. These bent edges are continued toward the lower part, forming a rim of V-section, (see Fig. 4,) diminishing as it advances and converging toward $x'$ $y'$. The branch $y$ at the articulation of the two branches at $z$ is recessed for the reception of the branch $x$. (See Fig. 5.) Starting from the point $x'$ $y'$, the edges are raised toward the outside. At this part the two branches leave an aperture, B, which grips the line or cord on which the articles are suspended.

Externally the lower parts terminate in cups, the edges of which are bent outward from the inside, (see Fig. 6,) the base or bottom of which cups may be striated or furnished with india-rubber rings to increase the adhesive power and more firmly hold the object gripped.

The following is a description of our improved machine for making these clips.

$a$ is a frame of any convenient form and dimensions, and it supports three shafts, $b$ $c$ $d$. The shaft $b$ is the driving-shaft, and for this purpose is furnished with pulleys $b'$ $b^2$ and fly-wheels $b^3$ $b^3$ and pinions $b^4$ $b^4$. The pinions $b^4$ $b^4$ gear with toothed wheels $c'$ $c'$ on the succeeding shaft, $c$. This latter shaft carries a toothed wheel, $c^2$, which gears with an intermediate wheel, $e$, gearing with a cog-wheel, $d'$, on the shaft $d$. At the opposite end of the shaft $d$ is loosely mounted a ratchet-wheel, $d^2$, and a cog-wheel, $d^3$, solid with each other. The cog-wheel $d^3$ communicates with a pinion, $h$, which in its motion draws with it a wheel, $h'$, placed in such a manner that it governs two pinions, $i$ and $j$, each transmitting the motion respectively to two pinions of equal diameter, $i'$ $j'$. The two couples of toothed wheels $i$ $i'$ $j$ $j'$ are connected with and operate the feed cylinders or rollers $k$ $k'$ $l$ $l'$, suitably supported in the frame $a$, between which rollers $k$ $k'$ $l$ $l'$ the band or plate of metal moves which is to be stamped. The ratchet $d^2$ at each turn of the shaft $d$ is advanced one tooth by means of the click $m$, mounted on an oscillating lever, $m'$, which is subject to the action of a spring, $m^6$, and a cam, $m^3$, on the shaft $d$. A spring, $m^2$, holds the click $m$ to its work. A lever, $n$, admits of stopping the lever $m'$ and click $m$ by drawing it by means of the lever $n$ and connecting-rod $n'$, which lever $n$ is situated at the points A or M of the sector S, according to whether the machine is at work or at rest.

In suitable bearings in the frame $a$ two carriages, $f$ $g$, are placed side by side, guided, as required, so that they can be displaced in a horizontal and rectilinear manner. Alternate rectilinear movement is communicated to them by two cams, $f'$ $g'$, keyed to the shaft $c$. The cam $f'$ acts on the carriage $f$ between the rollers $f^2$ $f^2$, and the cam $g'$ acts on the carriage $g$ between the rollers $g^2$ $g^2$. The rollers $f^2$ $g^2$ are loosely mounted on the transverse axes of these sliding carriages $f$ $g$. Near the shaft $d$ the carriages $f$ $g$ are armed, the one $f$ with a cutting-tool, $o$, and the other with a stamper, $p$. Matrices $o'$ $p'$ are fixed to the frame $a$, so that each one exactly corresponds with the punches $o$ $p$—that is to say, the plate which is cut by the tool $o$ is forced into the mold $o'$ and the stamper $p$ and mold $p'$ are of the form it is intended that the finished plates shall bear. Each time a blank is cut by the tool $o$ the ratchet $d^2$ is advanced one tooth by means of the cam $m^3$, lever $m'$, and click $m$, to advance the sheet of metal through the rollers $k$ $k'$ $l$ $l'$. In front of the tool $o$ and mold $o'$ and on the shaft $d$ a cam, $q$, is fixed, which governs the backward and forward motion of a kind of shuttle $q'$.

The shuttle $q'$ carries a spring, $q^4$, adapted to bear upon the side or edge of the cut blank within the mold $o'$. After the blank is cut in the mold $o'$ the shuttle $q'$ is advanced toward the stamper and mold $p$ $p'$. The spring $q^4$, bearing upon the cut blank, pushes said blank along toward and in front of the stamper and mold, said blank passing through the guide-slot $q^5$. When the blank so advanced by the shuttle $q'$ and spring $q^4$ arrives in front of the mold $p'$, the stamper $p$ advances to shape the blank, the shuttle $q'$ retreating to push another blank from the mold $o'$, as before described.

In the mold $p'$ two spring-expellers, $r$ $r$, are placed, which are actuated by cams $r'$ $r'$, carried by the shaft $d$. The cams are adapted to bear upon one end of the expellers $r$ $r$. The expellers act to push the stamped article from the mold when pressed by the cams $r'$ $r'$ as the stamper $p$ passes to the rear and away from the mold $p'$. Before leaving the mold the branches are pierced with the central apertures, by which they are united. For this purpose we provide a drill, as follows:

$s$ is a support carried by the frame $a$. The support $s$, in suitable bearings, carries a tool-holder, $t$, which turns and also slides vertically in the bearings. $s'$ is an arm articulated at $s^3$ to the support $s$ and at its other end to the holder $t$. The arm $s'$ is acted upon to raise the holder $t$ by a cam, $r$, on the shaft $d$, which preferably bears on a roller, $s^2$, carried by the arm $s'$, and to depress the holder by a spring, $u$. A bit, $t'$, is carried by the holder $t$, and it passes through a vertical aperture, $t^3$, of the mold $p'$.

Rapid rotation is communicated to the bit or drill $t'$ by the fly-wheel $b^3$, which by means of a cord or strap, $w$, transmits motion to a small pulley, $t^2$, with which the tool-holder $t$ is furnished.

To feed the machine continuously, the bands or plates of metal are cut the size required of uniform length, so that the periodical effect of a tooth, $d^5$, of the ratchet $d^2$ is regularly produced, as hereinafter stated.

In starting and pushing forward the sheet or band of metal the lever $n$ is placed at stop M, (marked on the sector $s$,) then the driving-belt is slipped onto the fixed pulley $b'$, and the whole machine is then set in motion, excepting the advance movement of the metal-sheet.

For the clearer comprehension of what follows, the ratchet $d^2$, which governs the advance of the metal sheet, has one tooth, $d^5$, half as long again as the rest, so as to make a greater course at the beginning and at the finish or end of the metal, so as to avoid false cuts, which further on would hinder the action of the machine and cause it to be stopped.

The stroke of the click is fixed for the particular tooth, for when the teeth are equally divided one only at a time can be acted on, which is equal to a loss of one-half tooth.

Fig. 12 shows a band of metal, B, cut in a normal manner, with the extreme edge B' larger than the divisions $B^2$ remaining after the plates are removed. As the number of the teeth of the ratchet $d^2$ corresponds exactly with the total number of the plates to be cut from a band, the same phase occurs at the end as at the beginning.

In commencing work the band B is first introduced between the rollers $k$ $k'$, and the lever $n$ is placed opposite the starting-mark M. The cutter-carriage $f$ now advances, being actuated by the cam $f'$, and by means of the cutting-tool $o$ cuts one of the plates shown by Figs. 12, 13, according to the cutters and matrices selected, whether for cutting the branch $x$, Fig. 2, or the branch $y$, Fig. 3. The punch or cutting-tool $o$ having pierced the metal band, engages in the mold $o'$, pushing forward the cut plate to the end of its course. This cut plate the shuttle $q'$ quickly conducts in front of the stamping-mold $p'$, as before described. While this takes place the carriage $f$ returns quickly to the rear, to be again moved forward to cut the metal advanced by means of the rollers $k\ k'$ and ratchet $d^2$, connected therewith. As soon as the plate reaches this point and is in front of the mold or matrix $p'$, the carriage $g$ advances by the action of the cam $g'$, its punch $p$ stamping the metal into the mold. At the same time the shuttle $q'$ reaches quickly to seize the next plate.

*Punching.*—The carriage $g$ having reached the end of its course, it remains a moment, while the perforator $t'$, animated with a very rapid rotary motion, descends by the joint action of the spring $u$ and cam $v$ and pierces the stamped metal within the mold $p'$. The perforator then immediately rises. As the carriage $g$ recedes and withdraws the punch $p$, the expellers advance through the mold $p'$, the cams $r'\ r'$ at this time coming into play to push them forward. As the expellers $r\ r$ move forward, they push the stamped metal out of the mold $p'$. When they have performed this work, a narrow part of the cam $v$ comes opposite them, which permits their springs to push them inward again. The two branches thus stamped in their respective molds are then united by hand by inserting one within the other and putting the axis or pivot in its place, and all that then remains to be done to complete the clip is to mount the spring $a$ in the upper cavities.

We claim as our invention—

1. In a machine for forming clips, the combination, with the frame $a$, of the two carriages $f\ g$, carrying dies $o\ p$, the molds $o'\ p'$, and means for reciprocating the carriages $f\ g$, substantially as described.

2. The combination of the frame $a$, carriages $f\ g$, and means for reciprocating them, dies $o\ p$, carried by the carriages $f\ g$, molds $o'\ p'$, and shuttle $q'$, for passing a blank from the mold $o'$ to the stamping-mold $p'$, substantially as described.

3. The combination of the reciprocating carriages $f\ g$, stamping-die $p$, carried thereby, mold $p'$, expellers $r\ r$, within the mold, and means for reciprocating the expellers longitudinally, substantially as described.

4. The combination of the shaft $d$, cam $m^3$, ratchet $d^2$, gear-wheel $d^3$, rigid with $d^2$, spring-pressed lever $m'$, click $m$, and rollers $k\ k'\ l\ l'$, driven from the wheel $d^3$, substantially as described.

5. The ratchet-wheel $d^2$, having tooth $d^5$, larger than the others, lever $m'$, having click $m$, lever $n$, connected with the lever $m'$, and a guide for the lever $n$, substantially as described.

6. The combination, with the mold $p'$, having the passage $t^3$, and with the stamper $p$, of the drill $t\ t'$ and means for rotating same and for reciprocating it longitudinally, substantially as described.

FERDINAND EMILE GIRARD.
ALEXANDRE RIGAULT.

Witnesses:
ROBT. M. HOOPER,
ALPHONSE BLÉTRY.